(12) United States Patent
Totori

(10) Patent No.: US 7,733,399 B2
(45) Date of Patent: Jun. 8, 2010

(54) IMAGE SENSING APPARATUS AND METHOD OF ACQUIRING TRAVELING CHARACTERISTICS OF LIGHT-SHIELDING MEMBER

(75) Inventor: Yuki Totori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 429 days.

(21) Appl. No.: 11/845,312

(22) Filed: Aug. 27, 2007

(65) Prior Publication Data

US 2008/0291306 A1   Nov. 27, 2008

(30) Foreign Application Priority Data

Sep. 8, 2006   (JP)   ............... 2006-244830

(51) Int. Cl.
*H04N 3/14* (2006.01)
*H04N 5/235* (2006.01)

(52) U.S. Cl. .................. 348/296; 348/363; 348/224.1
(58) Field of Classification Search ................ 348/296, 348/224.1, 363
See application file for complete search history.

(56) References Cited

U.S. PATENT DOCUMENTS

| | | | | |
|---|---|---|---|---|
| 6,256,066 | B1 * | 7/2001 | Yukawa et al. ............. | 348/340 |
| 7,209,170 | B2 * | 4/2007 | Nishino et al. ............. | 348/302 |
| 7,538,816 | B2 * | 5/2009 | Harada ...................... | 348/362 |
| 2004/0218087 | A1 * | 11/2004 | Jazbutis et al. ............. | 348/362 |
| 2006/0087573 | A1 | 4/2006 | Harada | |
| 2006/0098115 | A1 | 5/2006 | Toyoda | |

FOREIGN PATENT DOCUMENTS

| | | |
|---|---|---|
| JP | 11-041523 | 2/1999 |
| JP | 2002-064752 | 2/2002 |
| JP | 2005-159418 | 6/2005 |
| JP | 2006-101492 A | 4/2006 |
| JP | 2006-166417 A | 6/2006 |

OTHER PUBLICATIONS

The above reference was cited in a Sep. 4, 2009 European Search Report of the counterpart European Patent Application No. 07115970.1.

The above references were cited in a Sep. 8, 2008 Japanese Office Action issued in the counterpart Japanese Patent Application 2006-244830.

* cited by examiner

*Primary Examiner*—Sinh Tran
*Assistant Examiner*—Hung H Lam
(74) *Attorney, Agent, or Firm*—Cowan, Liebowitz & Latman, P.C.

(57) ABSTRACT

A method of acquiring traveling characteristics of rear blades in a camera having an image sensing element including a plurality of pixels. The method comprising acquiring the traveling characteristics of the rear blades based on an image signal output from a preset partial area of the image sensing element, and storing the acquired traveling characteristics (S34, S36), shifting the partial area to a different position along the traveling direction of the rear blades (S38), and updating the traveling characteristics of the rear blades stored in the storage medium, based on an image signal output from the partial area shifted to the different position (S35, S36).

11 Claims, 11 Drawing Sheets

IMAGE SENSING APPARATUS AND METHOD OF ACQUIRING TRAVELING CHARACTERISTICS OF LIGHT-SHIELDING MEMBER

BACKGROUND OF THE INVENTION

1. Field of the Invention

The present invention relates to a technique for controlling exposure and charge accumulation using an electronic shutter function that controls the charge accumulation time in an image sensing element and a mechanical shutter function for shielding the light receiving surface of the image sensing element with shutter blades.

2. Description of the Related Art

There are image sensing apparatuses such as digital cameras provided with a progressive scan CCD sensor (hereinafter, "PS-CCD") as an image sensing element. If a PS-CCD sensor is used as the image sensing element, the image sensing apparatus is able to control the exposure for image data to be obtained from the image sensing element by controlling the charge accumulation period from when charge is discharged until when accumulated charge is transferred. While the image sensing apparatus is able to regulate the charge accumulation period even without a mechanical shutter in the case where a PS-CCD sensor is used as the image sensing element, a mechanical shutter preferably is provided in order to suppress smear. However, smear cannot be completely prevented because of luminous flux reaching the PS-CCD sensor, even during the short period of time from when accumulation of the charge of the PS-CCD sensor is ended until when the PS-CCD sensor is shielded by the mechanical shutter. Various techniques have been proposed to suppress smear.

In contrast, a CMOS image sensor, which is an XY addressing type image sensing element, is advantageous in that the occurrence of smear is so small as to be negligible compared with a CCD sensor. Due to advances in enlarging technology, CMOS image sensors are often used in single reflex digital cameras, which require a large image sensing element with which high quality image data is readily obtained.

However, an XY addressing type CMOS image sensor uses a so-called rolling shutter, whereby charge is accumulated at a different timing for each row. With existing rolling shutters, it is neither possible to simultaneously reset the charge of all of the pixels, nor to simultaneously end the accumulation of charge (i.e., simultaneously read accumulated charge). A rolling shutter is not suited to taking moving objects as still images because of a lag of nearly one frame between the accumulation periods of the first and last rows of the scan screen. Thus, a mechanical shutter for controlling the exposure period is often used in image sensing apparatuses that use a CMOS image sensor.

Resetting the charge of each row in order to start accumulating the charge in the CMOS image sensor is started prior to the signal levels of accumulated charge in the row being read by an amount of time equal to the charge accumulation period. Note that charge can also be reset at a different speed to the scanning speed at which accumulated charge is read.

The following configuration, which takes advantage of this, is disclosed in Japanese Patent Laid-Open No. H11-41523. Charge accumulation is started after first resetting the charge of the CMOS image sensor one row at a time to match the traveling curve of the mechanical shutter, the CMOS image sensor is shielded with the mechanical shutter after a prescribed period, and the signal levels of the accumulated charge are then read one row at a time. Note that the traveling curve of a mechanical shutter shows the moving characteristics of the mechanical shutter, showing the position of the leading edge of the shutter blades relative to time. Exposure can be controlled by adjusting the interval between when charge is reset and when traveling of the mechanical shutter is started.

Since charge is thus reset one row at a time to match the traveling curve of the mechanical shutter, the difference in lengths of accumulation periods between the first and last rows of the scan screen can be improved to be about the same as when a mechanical shutter with front and rear curtains is used. Hereinafter, the shutter blades forming the front curtain will be called the "front blades", while the shutter blades forming the rear curtain will be called the "rear blades".

In addition to enabling smear to be suppressed when taking moving images because of the use of a CMOS image sensor, this configuration enables image capture with a high speed shutter, thereby making it possible to take still images of a moving object using a CMOS image sensor.

However, the front and rear blades of a mechanical shutter are generally driven by springs, with the holding power of an electromagnet often being used to hold the mechanical shutter in the start position. Thus, the traveling curve of the mechanical shutter is never constant. The traveling curve changes depending on a plurality of factors including the orientation of the image sensing apparatus, temperature, humidity, the drive voltage of the electromagnet holding the mechanical shutter, differences between individual mechanical shutters, and deterioration over time.

Thus, to reset charge at an appropriate timing that corresponds to the traveling of the mechanical shutter, a detection system for detecting the traveling curve of the mechanical shutter and a feedback system for controlling the timing at which charge is reset according to the detection result need to be provided. In view of this, Japanese Patent Laid-Open No. 2005-159418 discloses a configuration in which a plurality of photo-interrupters are disposed in the traveling direction of the front blades, and the traveling curve of the front blades is detected from the output of the photo-interrupters after scanning the front blades.

Another method of detecting the traveling curve of a mechanical shutter is disclosed in Japanese Patent Laid-Open No. 2002-064752. This method involves firstly resetting the charge of the image sensing element and acquiring a charge signal by reading the charge after a prescribed period has elapsed. Next, the charge of the image sensing element is again reset, and after the same prescribed period has elapsed, the mechanical shutter is scanned to shield the image sensing element, and the charge is read. The amounts of charge obtained from the two readings are compared, and the traveling curve is detected based on the result.

However, while the configuration of Japanese Patent Laid-Open No. 2005-159418 enables the timing at which charge is reset to be controlled by estimating the traveling curve of the rear blades in advance, the configuration of the shutter is enlarged by the provision of the photo-interrupters. Also, when optical sensors are disposed in a vicinity of the image sensing element, a configuration for preventing the light of the optical sensors from being incident on the light receiving surface of the image sensing element needs to be provided.

With the control method of Japanese Patent Laid-Open No. 2002-064752, on the other hand, the two charge amounts cannot be correctly compared if there is a change in luminance resulting from a change in the state of the object between the two charge accumulation periods, since several hundred milliseconds are required to read the charge of all of the pixels in the image sensing element. In such cases, the traveling curve of the mechanical shutter cannot be precisely detected. Further, if detection of the traveling curve of the mechanical shutter is started immediately before a normal image sensing operation, it takes time until the shot is actually taken since the image sensing operation is designated, resulting in an image sensing apparatus with a significant release time lag that is not convenient to use.

The time needed to detect the traveling curve can be shortened by reading the charge of a reduced number of pixels rather than all of the pixels in the image sensing element in order to detect the traveling curve of the mechanical shutter. However, a precise traveling curve cannot be derived in this case if the intervals between pixels whose charge is read out are long.

SUMMARY OF THE INVENTION

The present invention has been made in consideration of the above situation, and enables the traveling characteristics of a mechanical shutter to be acquired quickly and more precisely, without increasing the device configuration.

The present invention provides a method of acquiring traveling characteristics of a light-shielding member in an image sensing apparatus having an image sensing element including a plurality of pixels that converts an optical image of an object incident thereon to an electrical image signal and outputs the image signal, the light-shielding member being operable to occlude an aperture to the image sensing element, the method characterized by comprising: an acquiring step of acquiring the traveling characteristics of the light-shielding member based on an image signal output from a first selected partial area of the image sensing element, storing the acquired traveling characteristics in a storage means; a shifting step of shifting the partial area to a different position spaced apart from the first preset partial area along the traveling direction of the light-shielding member; repeating the acquiring step to acquire a further traveling characteristic for the shifted partial area; and storing the further traveling characteristic of the light-shielding member stored in the storage means.

The present invention also provides an image sensing apparatus comprising: an image sensing element having a plurality of pixels that converts an optical image of an object incident thereon to an electrical image signal and outputs the image signal; a light-shielding member that is operable to occlude an aperture to the image sensing element; a storage means; control means that is configured to acquire traveling characteristics of the light-shielding member based on an image signal output from a first preset partial area of the image sensing element, store the acquired traveling characteristics in the storage means, and shift the partial area to a different position spaced apart from the first preset partial area along the traveling direction of the light-shielding member, wherein the control means is configured to update the traveling characteristics of the light-shielding member stored in the storage means, based on an image signal from the partial area moved to the different position.

The present invention further provides a method of estimating the traveling characteristic of the shutter blade(s) in a camera having an image sensing element including a plurality of rows of photoelectric pixels, the method comprising: measuring the charge accumulated in pixels in a first selected partial area of the image sensing element in a time period $T_c$, measuring the charge accumulated in pixels in a second selected partial area of the image sensing device in the time period $T_c$, the second selected partial area being spaced apart from the first selected partial area in the direction of travel of the shutter blade(s), resetting the pixels to restart charge accumulation, driving the shutter blade(s) to travel to stop the light from impinging upon the first and second selected partial areas of the image sensing element after a time period nominally equal to the time period $T_c$, but differing from $T_c$ by different amounts because of the position/time traveling characteristic of the shutter blade(s), measuring the charge accumulated in the pixels in the first selected partial area of the image sensing element in the time period $T_a$, this time period starting with the pixel resetting operation on the first selected partial area and ending when the edge of the shutter blade(s) crosses the first selected partial area and blocks the light from impinging upon the first selected partial area, measuring the charge accumulated in the pixels in the second selected partial area of the image sensing element in the time period $T_b$, this time period starting with the pixel resetting operation on the second selected partial area and ending when the edge of the shutter blade(s) crosses the second selected partial area and blocks the light from impinging upon the second selected partial area, calculating from the accumulated charge measured during time periods $T_c$, $T_a$ and $T_b$ the time when the edge of the shutter blade(s) cross the first and second selected partial areas, thereby providing an estimate of the traveling characteristic.

Further features of the present invention will become apparent from the following description of exemplary embodiments (with reference to the attached drawings).

DESCRIPTION OF THE EMBODIMENTS

A preferred embodiment of the present invention will now be described in detail in accordance with the accompanying drawings.

Figure 1:
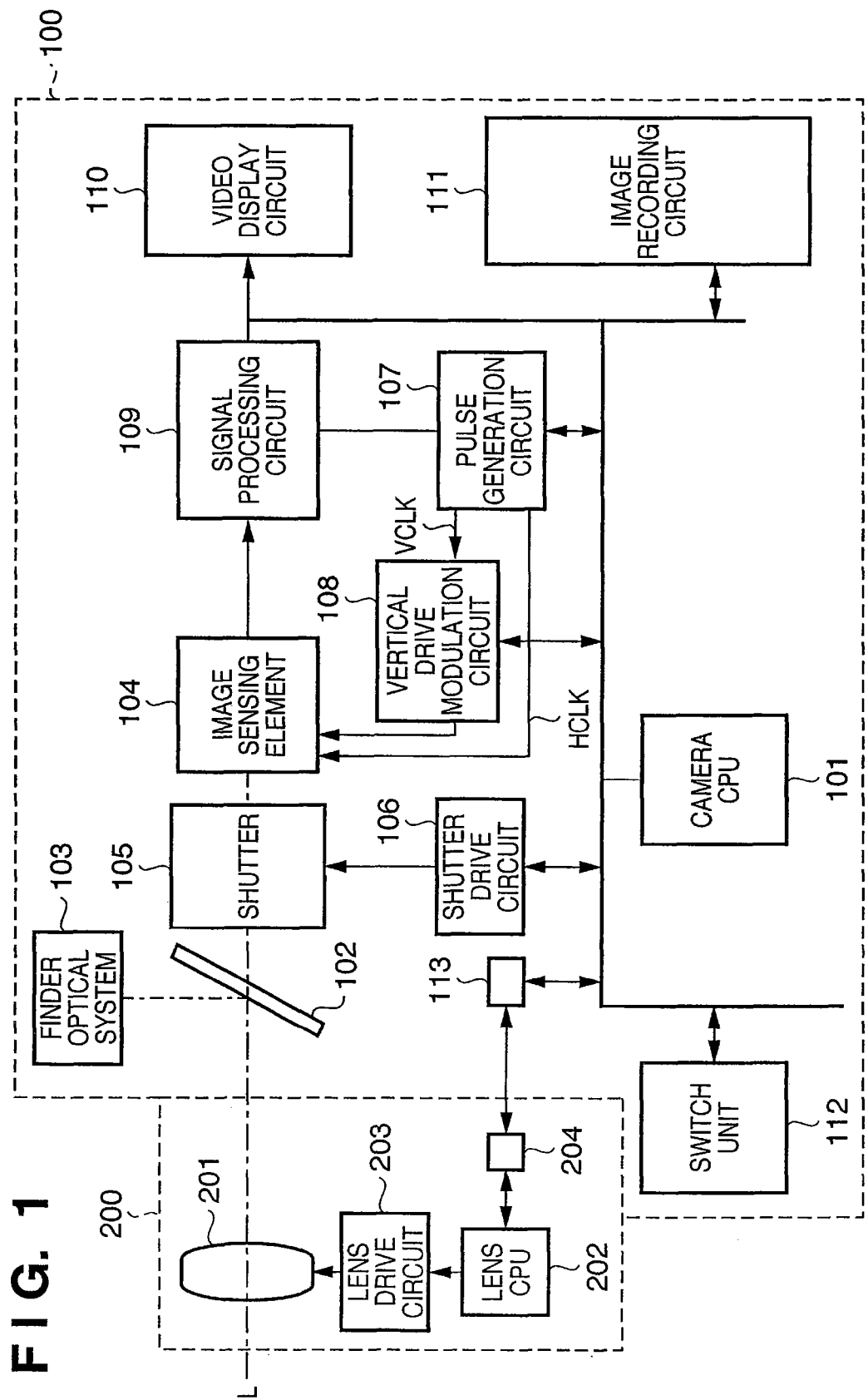
FIG. 1 is a block diagram showing a configuration of an image sensing system according to an embodiment of the present invention.

FIG. 1 is a block diagram showing a configuration of an image sensing system according to a first embodiment of the present invention. The image sensing system according to the embodiment comprises a camera body 100, which is an image sensing apparatus, and an interchangeable lens apparatus 200 mounted to the camera body 100. Note that the lens apparatus 200 may be integrally formed with the camera body 100, rather than being removable from the camera body 100.

Firstly, the internal configuration of the interchangeable lens apparatus 200 will be described. Reference numeral 201 denotes an image sensing lens that is moveable in a direction of an optical axis L. Note that while only one lens is shown as the image sensing lens 201 in FIG. 1 in order to simplify the figure, the image sensing lens 201 may actually be constituted by a lens group composed of a plurality of lens.

Reference numeral 202 denotes a lens CPU, and reference numeral 203 denotes a lens drive circuit, with the lens CPU 202 controlling the position of the image sensing lens 201 via the lens drive circuit 203. The lens CPU 202 communicates with a camera CPU 101 in the camera body 100 via a communication point 204 in the interchangeable lens apparatus 200 and a communication point 113 in the camera body 100.

The internal configuration of the camera body 100 will be described next. Reference numeral 101 denotes the camera CPU, reference numeral 102 denotes a mirror member, and reference numeral 103 denotes a finder optical system. Reference numeral 104 denotes an XY addressing type image sensing element, which in the present embodiment is a CMOS image sensor, for example. Reference numeral 105 denotes a focal plane shutter, which is a mechanical shutter apparatus. The mirror member 102 is for reflecting luminous flux forming an image of an object that has passed through the image sensing lens 201 towards the finder optical system 103. The mirror member 102 switches between a position on the optical path as shown in FIG. 1 for guiding the luminous flux to the finder optical system 103, and a position removed from the optical path for letting the luminous flux travel to the image sensing element 104. When the user is monitoring an object through the finder optical system 103, the mirror member 102 is positioned on the optical path as shown in FIG. 1. On the other hand, when an image is being captured, or when the user is monitoring an object by observing moving images of the object displayed on a video display circuit 110 (described later), the mirror member 102 moves out of the optical path (upward direction in FIG. 1).

The shutter apparatus 105 is disposed on the object side of the image sensing element 104, and luminous flux reaches the image sensing element 104 as a result of the shutter blades of the shutter apparatus 105 being removed from the optical path. In the present embodiment, the shutter apparatus 105 has only rear blades as described below, and the exposure period can be controlled by controlling the charge reset scan of the image sensing element 104 and the driving of the rear blades. Note that the present invention is not limited to this configuration, and the shutter apparatus 105 may naturally have both front and rear blades. If front blades are provided, the exposure period is controlled when taking a still image, by firstly resetting the charge of the image sensing element 104 after opening the front blades to fully open the aperture, and then closing the rear blades after a prescribed exposure period has elapsed to close the aperture. If the user is monitoring an object by observing moving images of the object displayed on the video display circuit 110 (described later), the shutter blades of the shutter apparatus 105 are removed from the optical path.

Reference numeral 106 denotes a shutter drive circuit that controls the driving of the shutter apparatus 105. Reference numeral 107 denotes a pulse generation circuit, and reference numeral 108 denotes a vertical drive modulation circuit. The pulse generation circuit 107 supplies a scan clock signal and a control pulse to the image sensing element 104. A horizontal scan clock signal (HCLK) is directly input to the image sensing element 104 out of the scan clock signals generated by the pulse generation circuit 107. A vertical scan clock signal (VCLK) is input to the image sensing element 104 after the clock frequency has been modulated to a prescribed frequency by the vertical drive modulation circuit 108. The pulse generation circuit 107 outputs a clock signal also to a signal processing circuit 109.

Reference numeral 109 denotes a signal processing circuit, which generates image data by performing known analog signal processing and digital signal processing on the signal read from the image sensing element 104. Reference numeral 110 denotes the video display circuit, such as an LCD, or the like. The video display circuit 110 realizes an electronic viewfinder (EVF) function by sequentially displaying images taken at a predetermined cycle using image data for display generated by the signal processing circuit 109. Reference numeral 111 denotes an image recording circuit that records image data generated by the signal processing circuit 109 in an internal memory of the camera body 100 or a recording medium that is removable from the camera body 100.

Reference numeral 112 denotes a switch unit that includes a switch which is operated to set the image sensing conditions, and a switch which is operated to start an image sensing preparation operation and an image sensing operation.

The configuration and operations of the XY addressing type image sensing element 104 in the present embodiment will be described next. Firstly, the configuration of the image sensing element 104 will be described with reference to FIG. 2.

Figure 2:
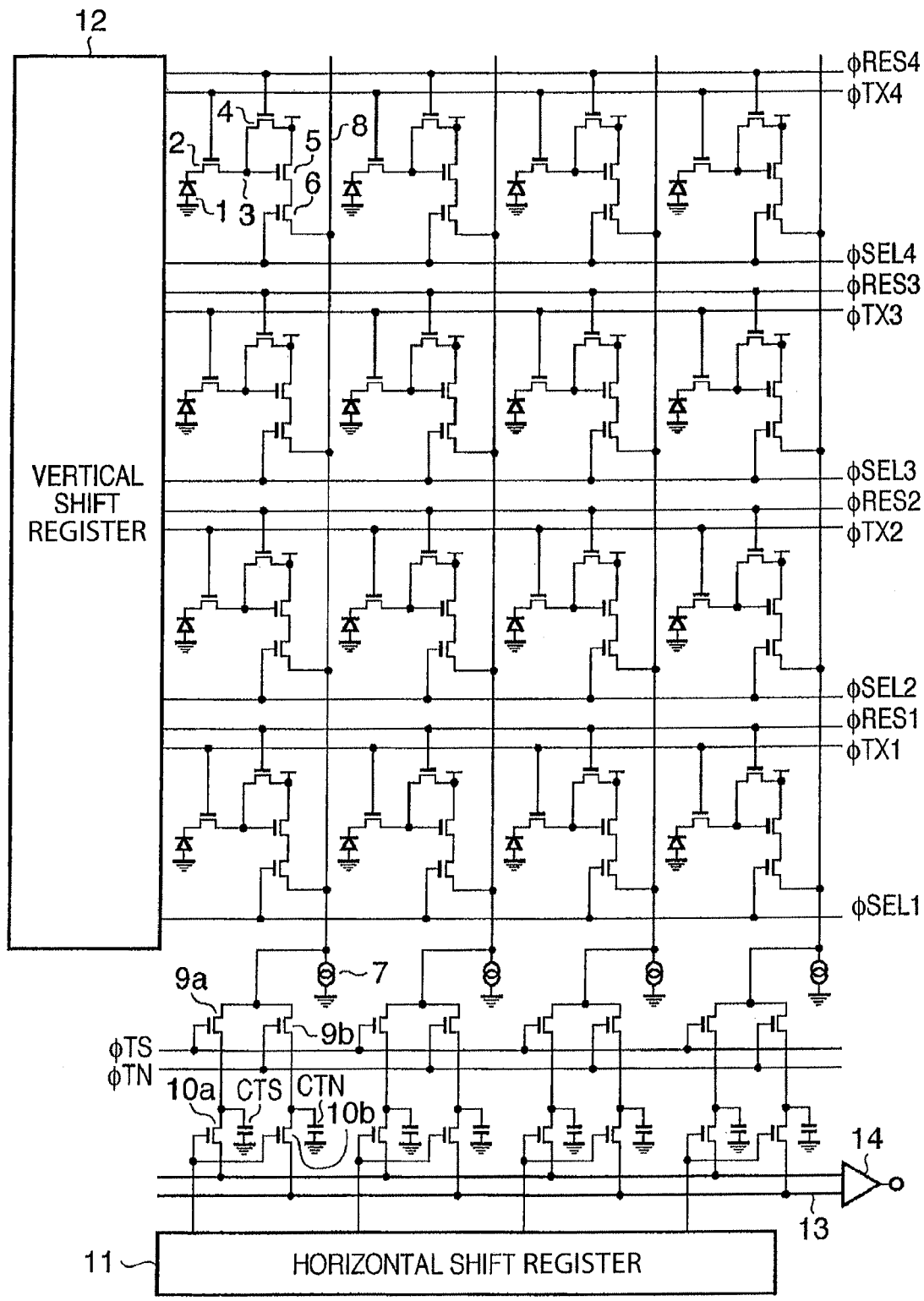
FIG. 2 is a circuit diagram showing a configuration of an image sensing element according to an embodiment of the present invention.

In FIG. 2, reference numeral 1 denotes a photodiode (PD) that performs photoelectric conversion. The PD 1 accumulates charge corresponding to the amount of incident light by converting the incident light to charge using photoelectric conversion. Reference numeral 2 denotes a transfer switch that transfers charge from the PD 1, and reference numeral 3 denotes a floating diffusion portion (FD) that temporarily accumulates the charge generated by the PD 1. Reference numeral 4 denotes a reset switch that supplies a reset potential to the FD 3, and is used for resetting the accumulated charge of the PD 1 and the charge of the FD 3. Reference numeral 5 denotes a pixel amplifier that converts the charge amount to a voltage amount, with the potential of the FD 3 as a gate input, while reference numeral 6 denotes a selection switch that selects the pixel amplifier.

Reference numeral 7 denotes a load current source, reference numeral 8 denotes a vertical output line that conveys the output of selected rows, reference numeral 9a denotes a signal level transfer switch for transferring the signal levels of selected rows, and reference numeral 9b denotes a reset level transfer switch for transferring the reset levels of selected rows. CTS is a signal level holding capacitor for holding a signal level, and CTN is a reset level holding capacitor for holding a reset level. Reference numerals 10a and 10b denote transfer switches for transferring the signal level and reset level held respectively in the capacitors CTS and CTN to a common output line 13 in order for each column. Reference numeral 11 denotes a horizontal shift register that turns ON the pair of transfer switches 10a and 10b in order for each column, and reference numeral 12 denotes a vertical shift register that selects rows. Reference numeral 14 denotes a differential amplifier that amplifies the differential signal of the signal level and reset level transferred on the common output line 13, and outputs the amplified signal.

Note that while only 16 pixels (4×4 pixels) are shown in FIG. 2 in order to simplify the description, the majority of normal solid state image sensing apparatuses are constituted by a great many pixels numbering from the 100 thousands to the millions (e.g., 2000 rows×3000 columns).

Controls in the case where the image sensing element 104 configured as described above is driven using a conventional so-called rolling shutter, without using the shutter apparatus 105, will be described next with reference to FIGS. 2, 3A and 3B.

Firstly, the operations to accumulate and read the charge of pixels in the first row will be described. Before starting to accumulate charge, the reset switches 4 and the transfer switches 2 are turned ON by setting φRES1 and φTX1 of the first row to high, and the PDs 1 and the FDs 3 are reset. Then, charge accumulation in the PDs 1 is started when the reset switches 4 and the transfer switches 2 are turned OFF by setting φRES1 and φTX1 to low.

Next, prior to the end of the charge accumulation period, the FDs 3 are reset by setting φRES1 to high to turn ON the reset switches 4, and then the signals at this time are read to the vertical output lines 8 by setting φEL1 to high to turn ON the selection switches 6. By setting φTN to high at the same time, the signals read to the vertical output lines 8 are stored in the capacitors CTN via the reset level transfer switches 9b as reset noise levels.

Once the prescribed charge accumulation period has elapsed, the charge accumulated in the PDs 1 is transferred to the FDs 3 by setting φTX1 to high to turn ON the transfer switches 2. After the elapse of a standby period until the accumulated charge is read, output corresponding to the accumulated charge is read to the vertical output lines 8, by setting φSEL1 to high to turn ON the selection switches 6. By setting φTS to high at the same time, the signals read to the vertical output lines 8 are stored in the capacitors CTS via the signal level transfer switches 9a as signal levels.

The signal levels and reset noise levels of the first row are stored respectively in the capacitors CTS and CTN as a result of the above operations. A charge signal from which noise has been eliminated can be obtained by turning ON transfer switches 10a and 10b in order for each row in this state, and transferring the stored signal and reset noise levels to the differential amplifier 14.

While the above operations to accumulate and read the charge of the first row are similarly performed in relation to the second row onwards, the reset operation for the next row is started after leaving enough time to at least read the signals for one row transferred to the capacitors CTS and CTN.

Figure 3:
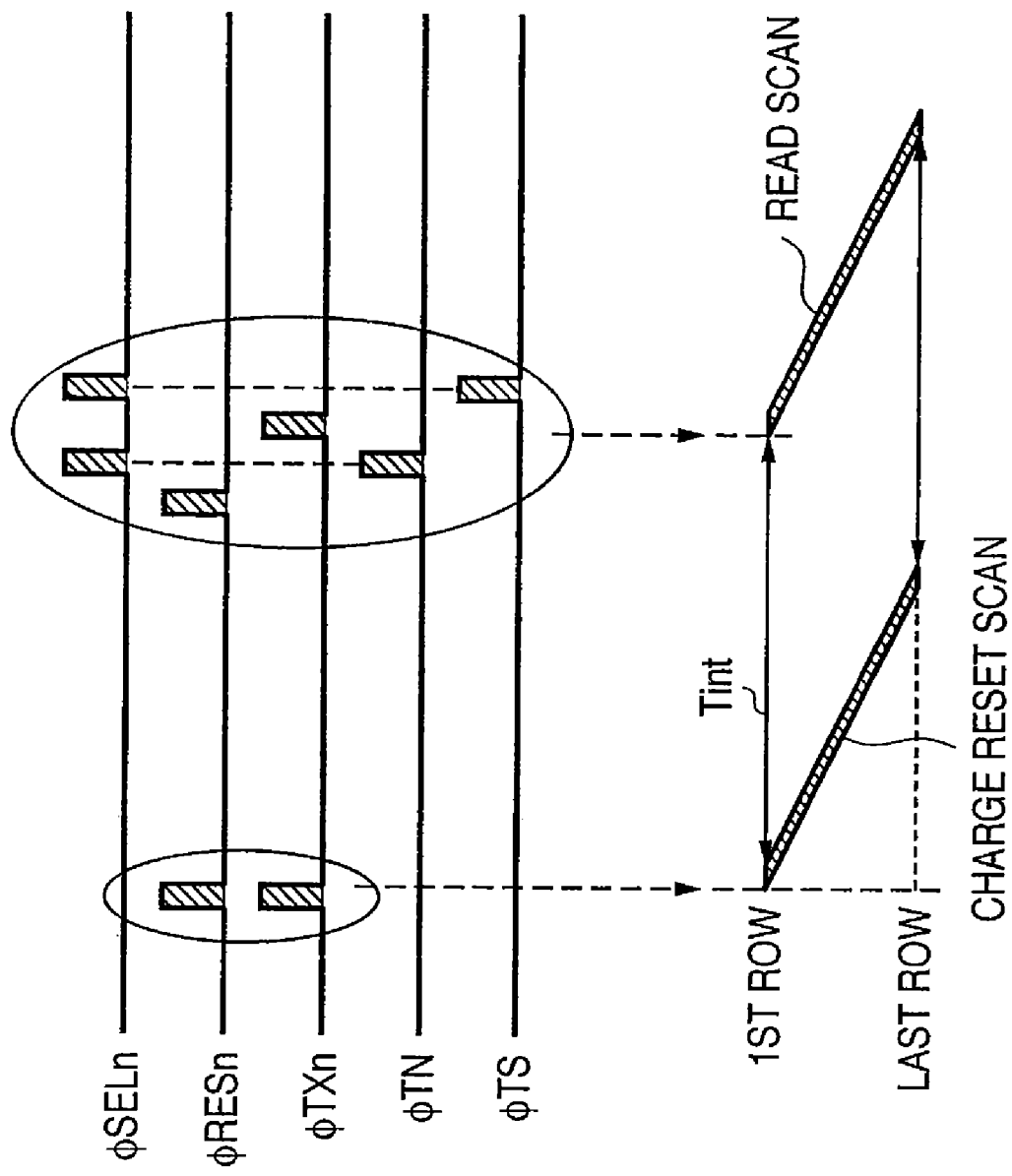
FIGS. 3A and 3B are timing charts illustrating the accumulation and reading of the charge of the image sensing element according to an embodiment of the present invention.

FIG. 3B is a schematic view showing the charge reset scan timing and the charge read scan timing of rows for one screen resulting from the rolling shutter drive, with Tint showing the charge accumulation period. As seen from FIG. 3B, the charge accumulation timings for the first and last rows are shifted significantly rather than being simultaneous.

Note that the reading may be controlled so that the bottom row is the first row and the top row is the last row, since the image of an object formed on the image sensing surface of the image sensing element 104 via the image sensing lens 201 is reversed top to bottom.

The configuration of the shutter apparatus 105 according to the present embodiment will be described next with reference to FIG. 4.

Figure 4:
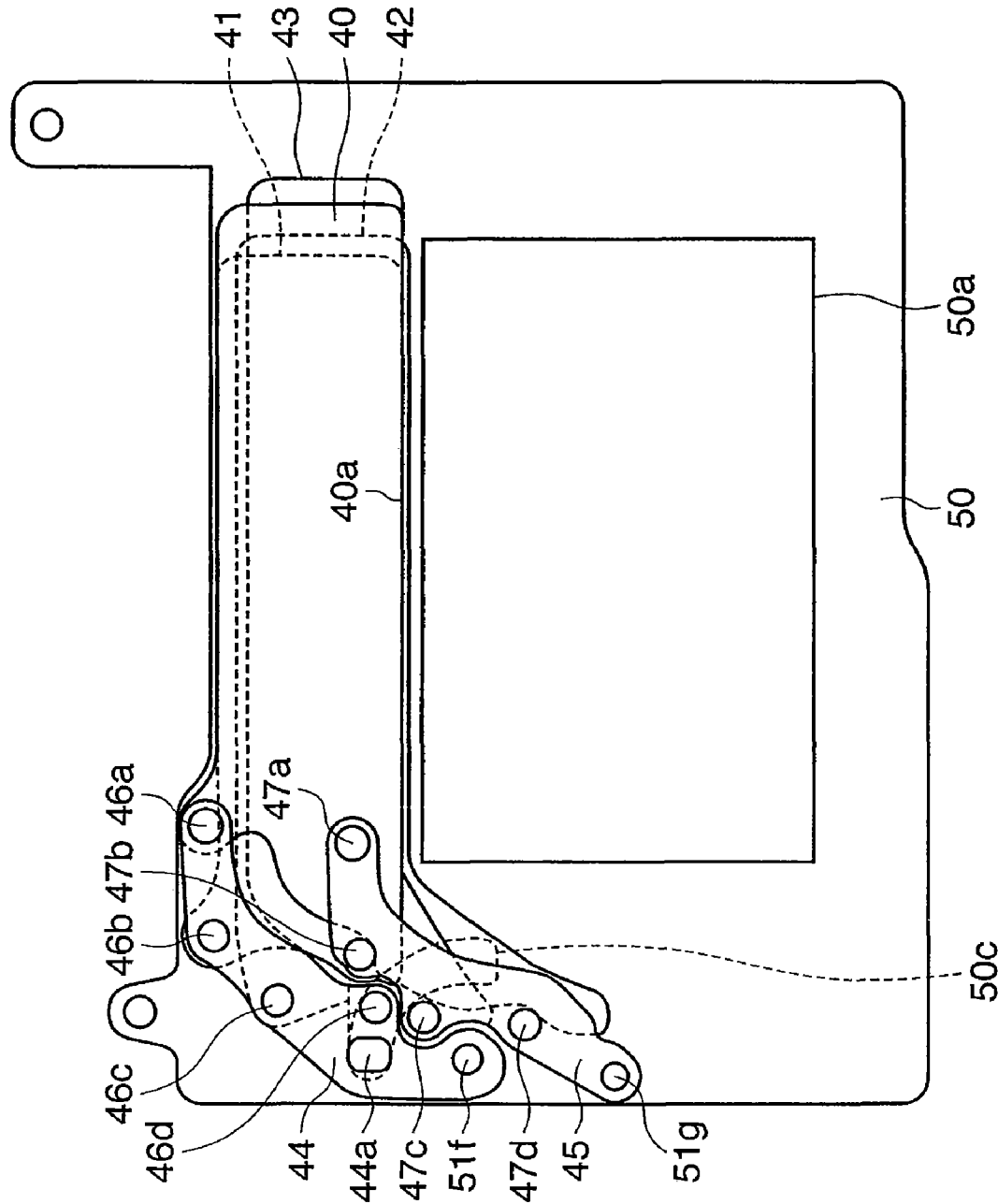
FIG. 4 is a configuration diagram of a shutter apparatus according to an embodiment of the present invention.

In FIG. 4, reference numeral 50 denotes a shutter baseboard having a shutter aperture, and reference numeral 50a denotes the shutter aperture. Reference numeral 40 denotes a rear slit forming blade, reference numeral 40a denotes a rear slit forming edge, and reference numerals 41 to 43 denote rear covering blades, with 41, 42 and 43 respectively called first, second, and third rear blades in order. Note that in the present embodiment the rear slit forming blade 40 and the rear covering blades 41 to 43 are collectively called rear blades. Reference numeral 44 denotes a first arm for the rear blades that is fitted rotatably around a shaft 51f provided in the shutter baseboard 50, and the rear slit forming blade 40 is rotatably supported relative to the first arm 44 by a light-blocking dowel 46a provided in the end of the first arm 44. Reference numeral 44a denotes a hole through which is inserted the drive pin of a rear blade driving member that transmits a driving force such as a spring force to the rear blades. Motive power is conveyed via this hole 44a from the rear blade driving member whose rotational axis is provided on the same axis of the shaft 51f.

Reference numeral 45 denotes a second arm for the rear blades. The second arm 45 is fitted rotatably around a shaft 51g provided in the shutter baseboard 50, and the rear slit forming blade 40 is rotatably supported relative to the second arm 45 by a light-blocking dowel 47a provided in the end of the second arm 45. A parallel link is thereby formed by the rear slit forming blade 40 and the first arm 44 and second arm 45 for the rear blades. Similarly, the first rear blade 41, the second rear blade 42 and the third rear blade 43 are rotatably supported respectively by light-blocking dowels 46b and 47b, 46c and 47c, and 46d and 47d in intermediate portions of the first arm 44 and the second arm 45, thereby forming parallel links. The rear blades (also collectively called the "rear curtain", which reflects their function) are thereby constituted. The shutter apparatus 105 of the present embodiment thus has only rear blades constituted by the members 40 to 47.

The method of detecting the traveling curve of the rear blades, which is a feature of the present embodiment, will be described next with reference to FIGS. 5 to 9.

Figure 5:
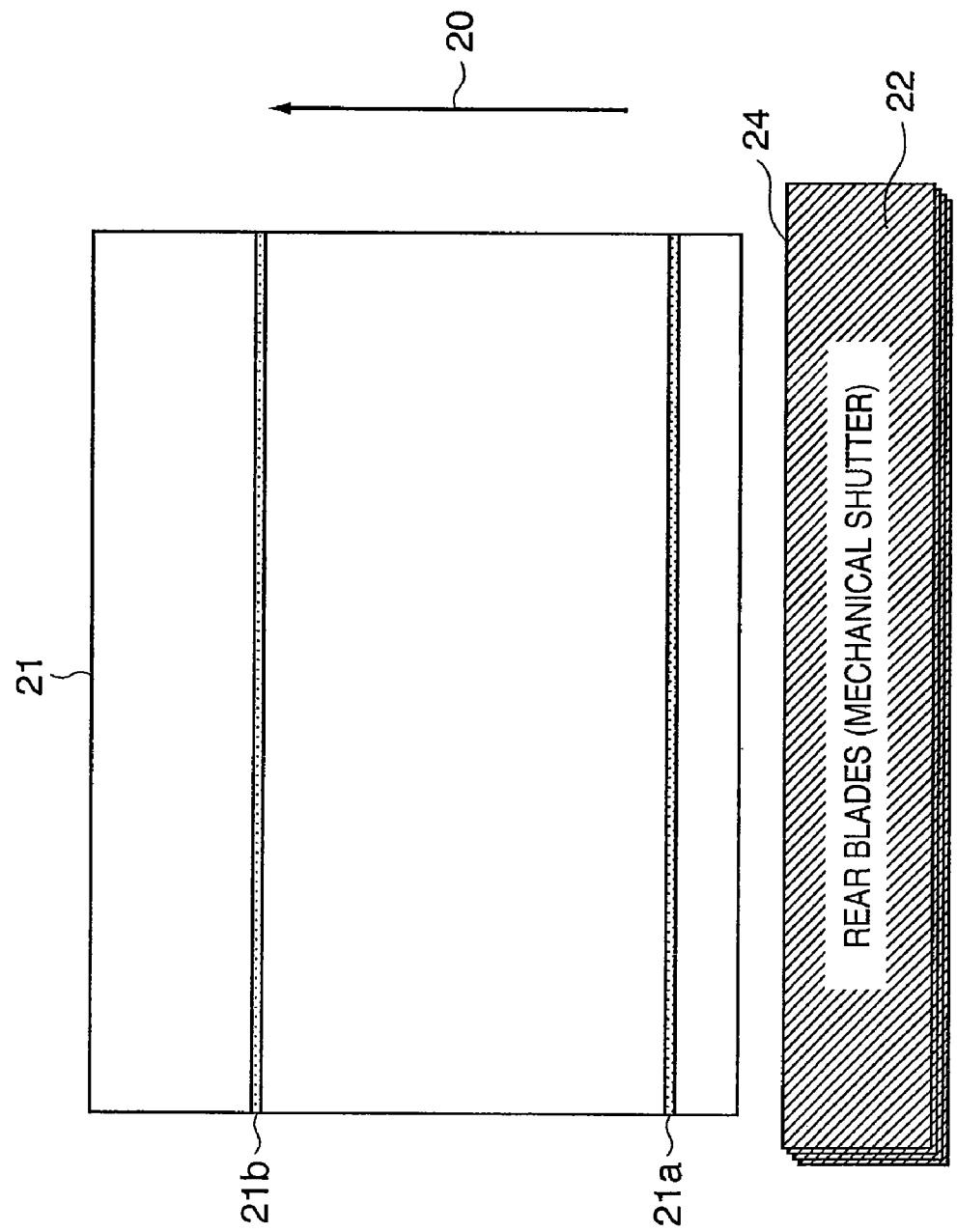
FIG. 5 is a schematic view of the image sensing element and rear blades when seen from the object side according to an embodiment of the present invention.

FIG. 5 is a schematic view showing the positional relation between the image sensing element 104 and the rear blades of the shutter apparatus 105 when seen from the object side of the optical axis direction.

The arrow 20 shows the scan direction of the reset and read scans, and the traveling direction of the rear blades. Reference numeral 21 denotes an image sensing surface of the image sensing element 104. Reference numeral 22 denotes rear blades composed of the above-described rear slit forming blade 40 and the rear covering blades 41 to 43, with the standby state prior to shielding the image sensing surface 21 being shown in FIG. 5. A leading edge 24 of the rear blades 22 is formed so as to be substantially parallel to the rows of pixels arrayed in the image sensing element 104. Reference numerals 21a and 21b both show an area of a respective pixel row on the image sensing surface 21. These pixel rows 21a and 21b are used in detecting the traveling curve of the rear blades (described below), and are called scan detection lines. These scan detection lines 21a and 21b are set in positions spaced apart from each other in the traveling direction of the rear blades (non-adjacent positions).

Figure 6:
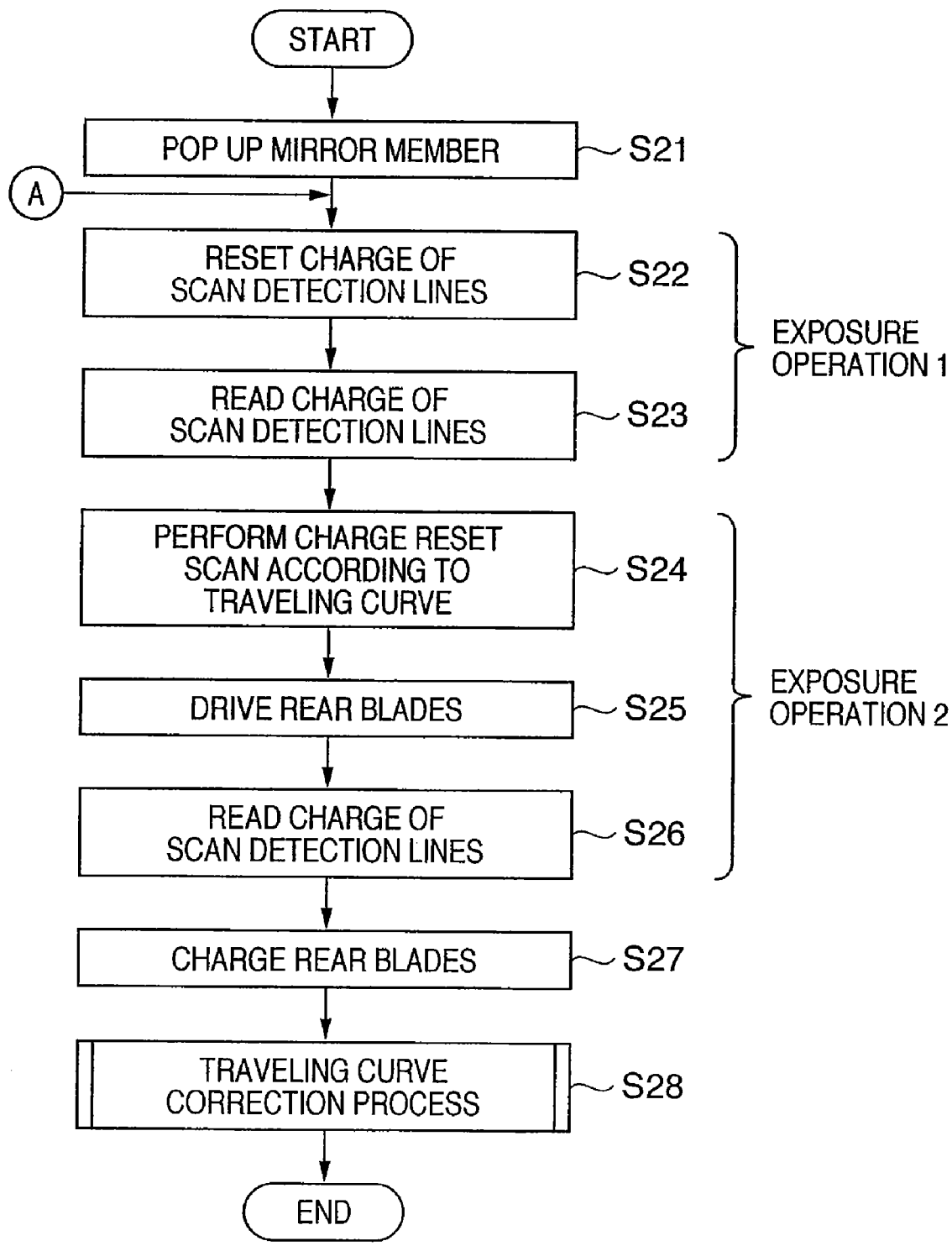
FIG. 6 is a flowchart illustrating the overall process for detecting the traveling curve of the rear blades according to an embodiment of the present invention.

FIG. 6 is a flowchart illustrating a process for detecting the traveling curve of the rear blades in the image sensing system according to the present embodiment. Note that this operation is performed in the case where, for instance, an instruction is issued to detect the traveling curve of the rear blades as a result of the user operating the switch unit 112. The operation is executed by the camera CPU 101 controlling the configuration required in the processes.

Firstly, in step S21, the camera CPU 101 moves the mirror member 102 to remove the mirror member 102 from the optical path, and to introduce the luminous flux of the object to the image sensing surface 21 of the image sensing element 104, with the rear blades 22 in the state shown in FIG. 5. Next, the camera CPU 101 in step S22 resets the scan detection lines 21a and 21b of the image sensing surface 21 in order, and in step S23 reads the charge accumulated in the scan detection lines 21a and 21b after a prescribed charge accumulation period $T_c$ has elapsed. The exposure operation of these steps S22 and S23 is called "exposure operation 1".

This exposure operation 1 can be executed in an extremely short time because not all of the pixels of the image sensing surface 21 have their accumulated charge read. Assuming a 6 mega pixel image sensing element with a 3:2 aspect ratio, for example, the time required if the charge accumulation information of all of the pixels were read would be 100 ms to 200 ms, since there will be 2000 pixel rows in the vertical direction. In contrast, according to the present embodiment, only 0.1 ms to 0.2 ms will be required in the reading, which is 1/1000 of the case where all of the pixels are read, since only two rows are read.

Consequently, exposure operation 1 can be completed in an extremely short time, which in the case of the charge accumulation period $T_c$ being set to 1/1000 sec (1 ms), would be within 2 ms in total.

Next, after completing exposure operation 1, the camera CPU 101 in step S24 controls to perform reset scans of the rows so as to match the traveling curve of the rear blades stored in an internal memory (not shown) of the camera body 100. Then, in step S25, the camera CPU 101 drives the rear blades 22 to shield the image sensing surface 21 after a prescribed exposure period Te has elapsed. Here, the exposure period Te is the same length as the charge accumulation period $T_c$ in exposure operation 1. Once the rear blades 22 have been driven, the camera CPU 101 in step S26 reads the charge of the scan detection lines 21a and 21b. The exposure operation of these steps S24 to S26 is called "exposure operation 2". Once the charge of the scan detection lines 21a and 21b has been read, the camera CPU 101 in step S27 controls to charge the rear blades 22 in readiness to perform a normal image sensing operation or the next traveling curve detection operation of the rear blades 22, and returns the rear blades 22 to the start position shown in FIG. 5.

Here, if the exposure period Te is set to 1/1000 sec (1 ms), the same as the charge accumulation period $T_c$, exposure operation 2 can be completed in around 5 ms, since the time from the start to the completion of the traveling of the rear blades 22 is normally around 4 ms.

Since the time needed to detect the traveling curve is thus minimal even when exposure operations 1 and 2 are performed consecutively, the time difference between exposure operations 1 and 2 can be disregarded. Consequently, a change in the state of the object in the scan detection lines 21a and 21b between exposure operations 1 and 2, that is, a difference in the charge accumulation amounts due to a change in luminance, can be disregarded.

After exposure operations 1 and 2 have ended, the camera CPU 101 in step S28 performs a process for correcting the traveling curve of the rear blades 22, based on the charge amounts of the scan detection lines 21a and 21b acquired in the above exposure operations 1 and 2. This correction process will be described in detail below with reference to FIGS. 8 to 9. The traveling curve detection process is ended once the traveling curve correction process has ended.

The process for correcting the traveling curve of the rear blades in the present embodiment, which is performed in step S28, will be described next with reference to FIGS. 7 to 10.

Figure 7:
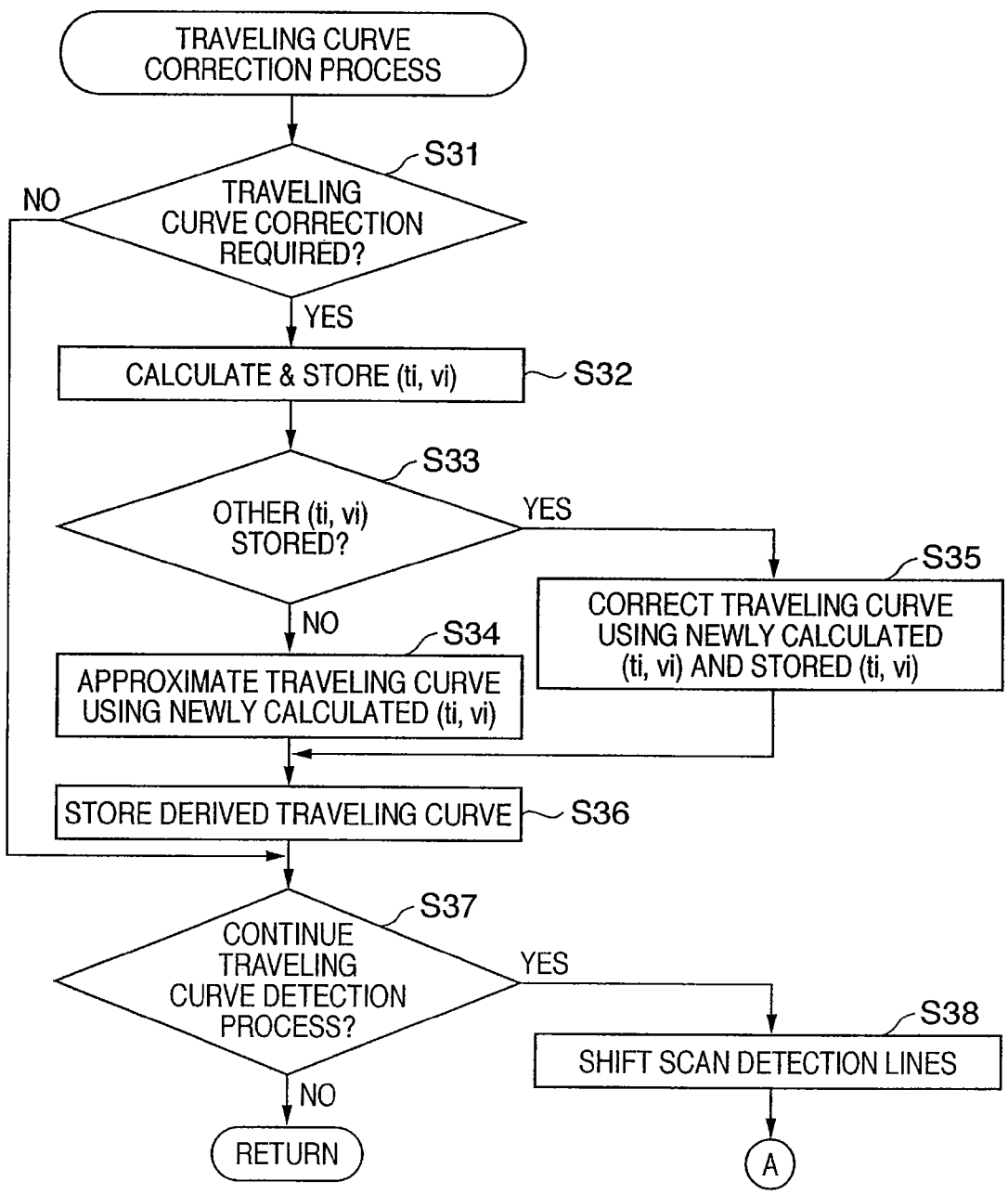
FIG. 7 is a flowchart illustrating a process for correcting the traveling curve of the rear blades according to an embodiment of the present invention.

FIG. 7 is a flowchart illustrating the traveling curve correction process. Firstly, in step S31, the camera CPU 101 judges whether the traveling curve needs correction, based on the charge amounts of the scan detection lines 21a and 21b obtained in exposure operations 1 and 2 as described above. Here, this judgment operation will be described with reference to FIG. 8.

Figure 8:
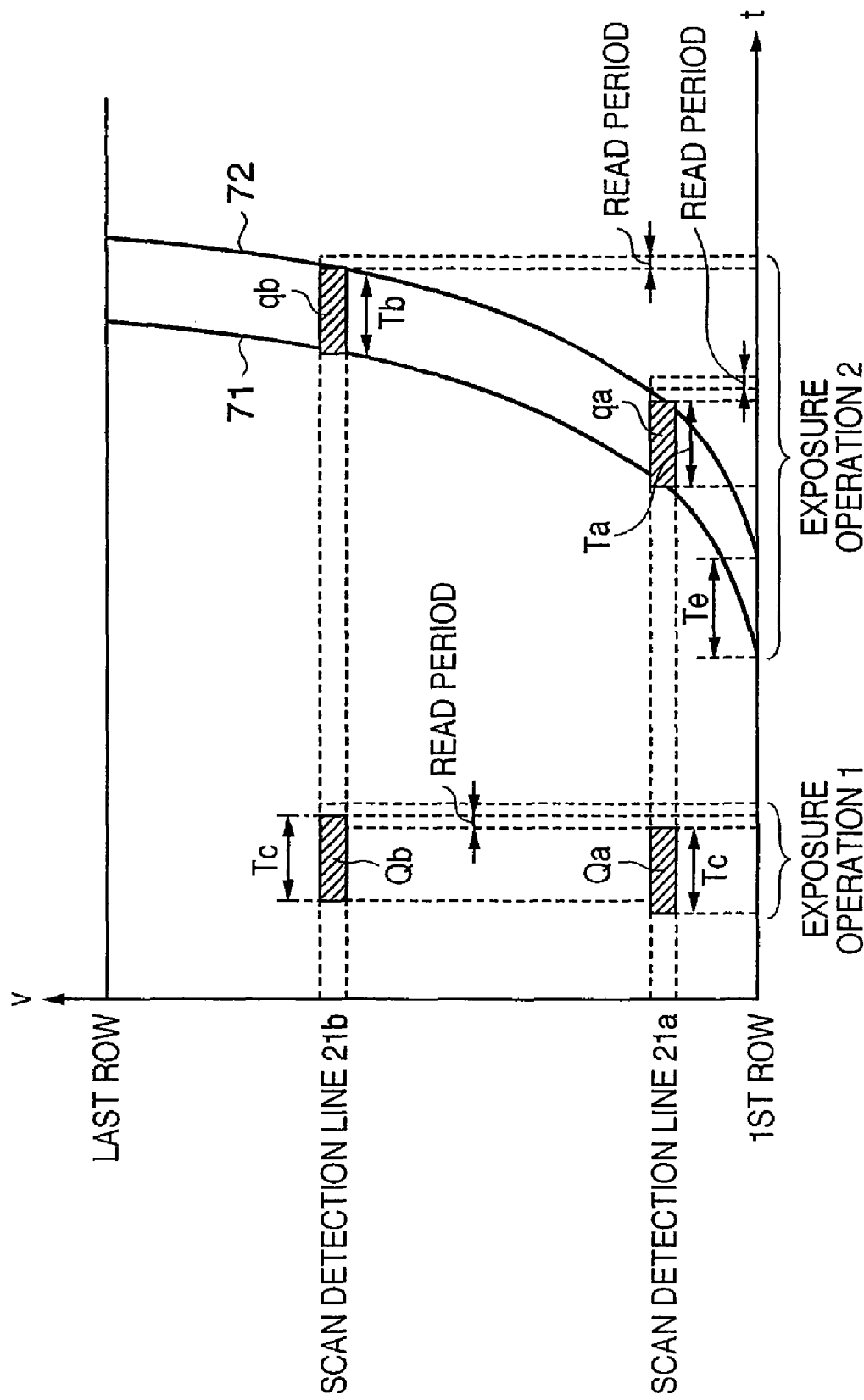
FIG. 8 is a schematic view showing the operations to reset charge, read charge and drive the rear blades in the traveling curve detection process, and the accumulated charge according to an embodiment of the present invention.

FIG. 8 is a schematic view showing the operations to reset charge, read charge and drive the rear blades in exposure operations 1 and 2. In FIG. 8, the vertical axis v shows the position on the image sensing surface 21 in the vertical direction, and the horizontal axis t shows time.

As shown in FIG. 8, the charge accumulation periods $T_c$ of the scan detection lines 21a and 21b in exposure operation 1 can be equated using pulse control. The total amounts of charge of the scan detection lines 21a and 21b obtained in exposure operation 1 are respectively called Qa and Qb.

Reference numeral 71 shows the scan curve of the charge reset scan performed in step S24 of exposure operation 2, and reference numeral 72 shows the traveling curve of the rear blades 22 in step S25. The charge amounts of the scan detection lines 21a and 21b obtained in exposure operation 2 are respectively given as qa and qb.

As mentioned above, a change in the state of the object between exposure operations 1 and 2, that is, a change in luminance, can be disregarded. Thus, the ratio of charge amounts Qa to qa and the ratio of charge amounts Qb to qb equate to the ratio of the charge accumulation period of exposure operation 1 to the exposure period of exposure operation 2 for the scan detection lines 21a and 21b, respectively. Where the actual exposure period of the scan detection line 21a in exposure operation 2 is given as ta, this exposure period can be expressed as $$ta = Tc * qa/Qa \quad (1)$$

Similarly, where the actual exposure period of the scan detection line 21b in exposure operation 2 is given as tb, this exposure period can be expressed as $$tb = Tc * qb/Qb \quad (2)$$

The differences (ta−Tc) and (tb−Tc) between the exposure periods ta, tb in exposure operation 2 thus derived and the charge accumulation period Tc in exposure operation 1 show the time lags between the correct traveling curve of the rear blades and the traveling curve used in the reset scan of exposure operation 2. (ta−Tc) and (tb−Tc) can be expressed by the following equations (3) and (4), based on the above equations (1) and (2).

$$(ta-Tc) = Tc*(qa-Qa)/Qa \quad (3)$$

$$(tb-Tc) = Tc*(qb-Qb)/Qb \quad (4)$$

As seen from equations (3) and (4), if there is no difference in the charge accumulation amounts resulting from the two exposure operations 1 and 2 (Qa=qa, Qb=qb), the exposure periods ta and tb will be equal to the charge accumulation period Tc, that is, the time differences will be zero. In this case, the traveling curve used in the reset scan is precise, and will not need correction.

Conversely, if a difference arises in the charge accumulation amounts resulting from the two exposure operations 1 and 2 (Qa≠qa, Qb≠qb), the exposure periods ta and tb will be different from the charge accumulation period Tc, that is, the time differences with respect to the exposure periods ta and tb will not be zero. Consequently, if even one of the time differences with respect to the exposure periods ta and tb is not zero, the scan curve used in the charge reset scan will not coincide with the actual scan curve, and will therefore need correction.

If correction of the scan curve is necessary as a result of the above judgment (YES in step S31 of FIG. 7), processing proceeds to step S32, and if not necessary, processing proceeds to step S37.

In step S32, the camera CPU 101 computes the times at which the leading edge 24 of the rear blades 22 actually passed across the scan detection lines 21a and 21b after starting to drive the rear blades 22 in exposure operation 2. The computed crossing times ti are stored in an internal memory (not shown) of the camera body 100 in association with respective positions vi of the scan detection lines 21a and 21b on the image sensing surface 21 in the vertical direction. Here, the method of computing the crossing times will be described with reference to FIG. 9.

Figure 9:
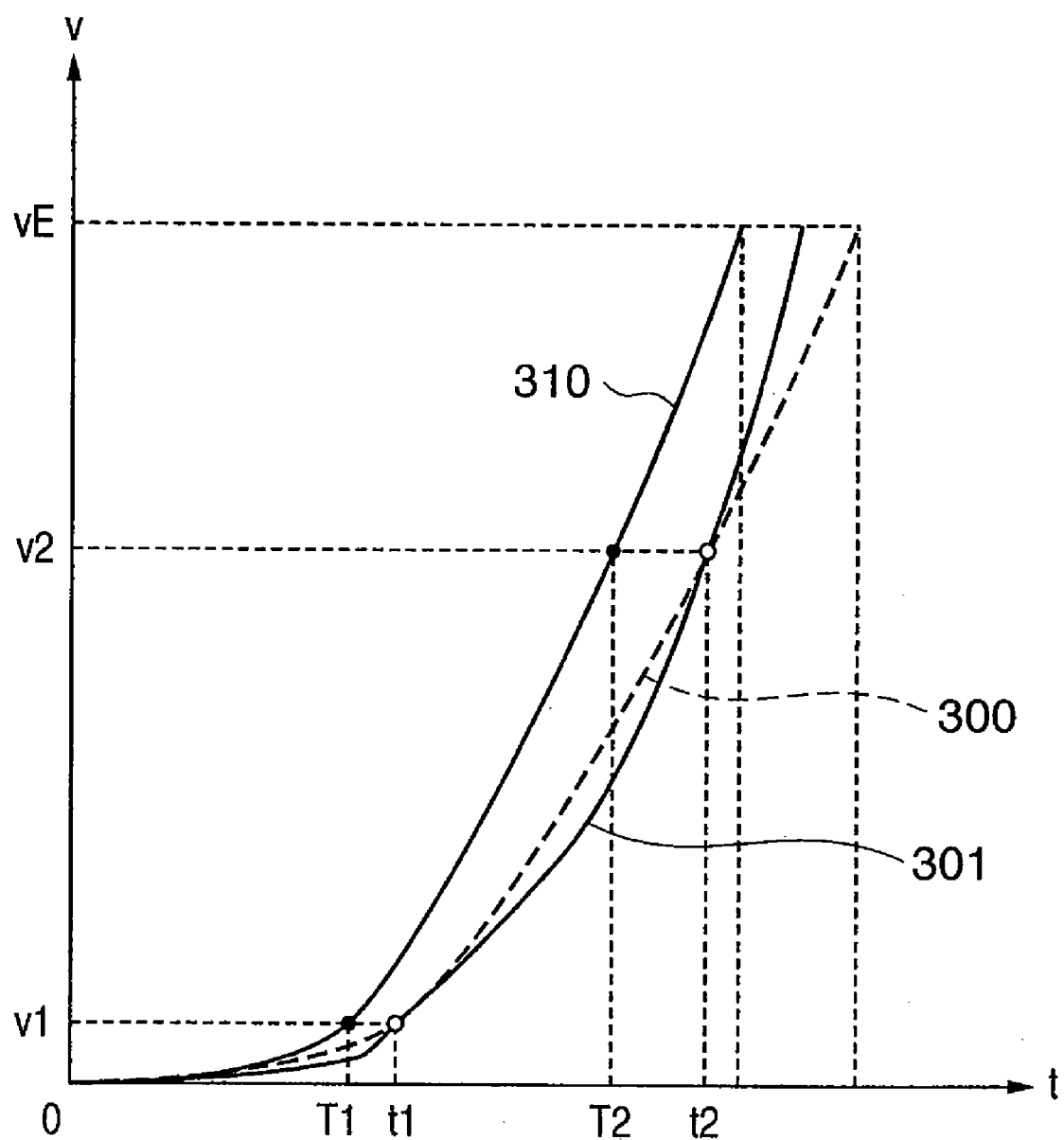
FIG. 9 illustrates a method of correcting the traveling curve of the rear blades in the traveling curve detection process according to an embodiment of the present invention.

In FIG. 9, the vertical axis v shows the position on the image sensing surface 21 in the vertical direction, and the horizontal axis t shows time. Here, the bottom and top edges of the image sensing surface are respectively given as v=0 and v=vE, while the scan detection lines 21a and 21b are respectively given as v=v1 and v=v2. The start time of the charge reset scan in exposure operation 2 is given as t=0. Reference numeral 310 denotes a traveling curve of the rear blades preset in the camera body 100, that is, the traveling curve used for the charge reset scan for the current exposure operation 2.

Firstly, the camera CPU 101 calculates the crossing times T1 and T2 of the rear blades 22 across the scan detection lines 21a and 21b, based on the traveling curve 310 held in the camera body 100.

Next, the camera CPU 101 derives the crossing times t1 and t2 at which the rear blades 22 actually pass across the scan detection lines 21a and 21b in exposure operation 2. Here, the differences between t1, t2 and T1, T2 can be calculated using the equations (3) and (4), since the differences between the above exposure periods ta, tb and the charge accumulation period Tc are equal. That is, $$t1-T1=ta-Tc=Tc*(qa-Qa)/Qa$$

Consequently, $$t1=T1+Tc*(qa-Qa)/Qa \quad (5)$$

Similarly, $$t2=T2+Tc*(qb-Qb)/Qb \quad (6)$$

t1 and t2 thus derived are stored in an internal memory (not shown) of the camera body 100 in association with v1 and v2 as (ti, vi)=(t1, v1) and (t2, v2) (step S32).

Next, in step S33, the camera CPU 101 judges whether (ti, vi) values other than the (ti, vi) values stored in step S32 are stored. If other (ti, vi) values are not stored, processing proceeds to step S34 of FIG. 7, and if other (ti, vi) values are stored, processing proceeds to step S35.

In step S34, a traveling curve 300 shown in FIG. 9 is derived by approximation, based on (t1, v1) and (t2, v2) derived in step S32. This traveling curve 300 can be derived as follows, for example. Firstly, the traveling curve data of the rear blades 22 obtained as a result of a traveling test measurement of the rear blades 22 performed in advance is stored in an internal memory (not shown) of the image sensing apparatus body.

The traveling curve 300 is then approximated by matching this traveling curve data with (t1, v1) and (t2, v2) obtained as aforementioned. The method of acquiring the traveling curve 300 of the rear blades 22 is not particularly limited, with it also being possible to prestore a traveling curve computed by simulating the scanning of the rear blades 22, and approximating the traveling curve using (t1, v1) and (t2, v2).

Note that the traveling curve 300 obtained in step S34 may differ from the actual traveling curve, since there are only two scan detection lines 21a and 21b of the rear blades 22. This occurs if the actual traveling curve changes in shape from the traveling curve data prestored in the internal memory of the camera body 100 or the traveling curve obtained from scan simulation. A curve 301 in FIG. 9 shows an exemplary actual traveling curve of the rear blades 22.

Once the traveling curve 300 has been acquired in step S34, the camera CPU 101 stores this traveling curve 300 in the internal memory of the camera body 100 (step S36), before proceeding to step S37. In step S37, the camera CPU 101 judges whether to continue the traveling curve detection process. In the present embodiment, the traveling curve 300 derived by approximation can be brought closer to the actual traveling curve 301 by continuing the traveling curve detection process.

Figure 10:
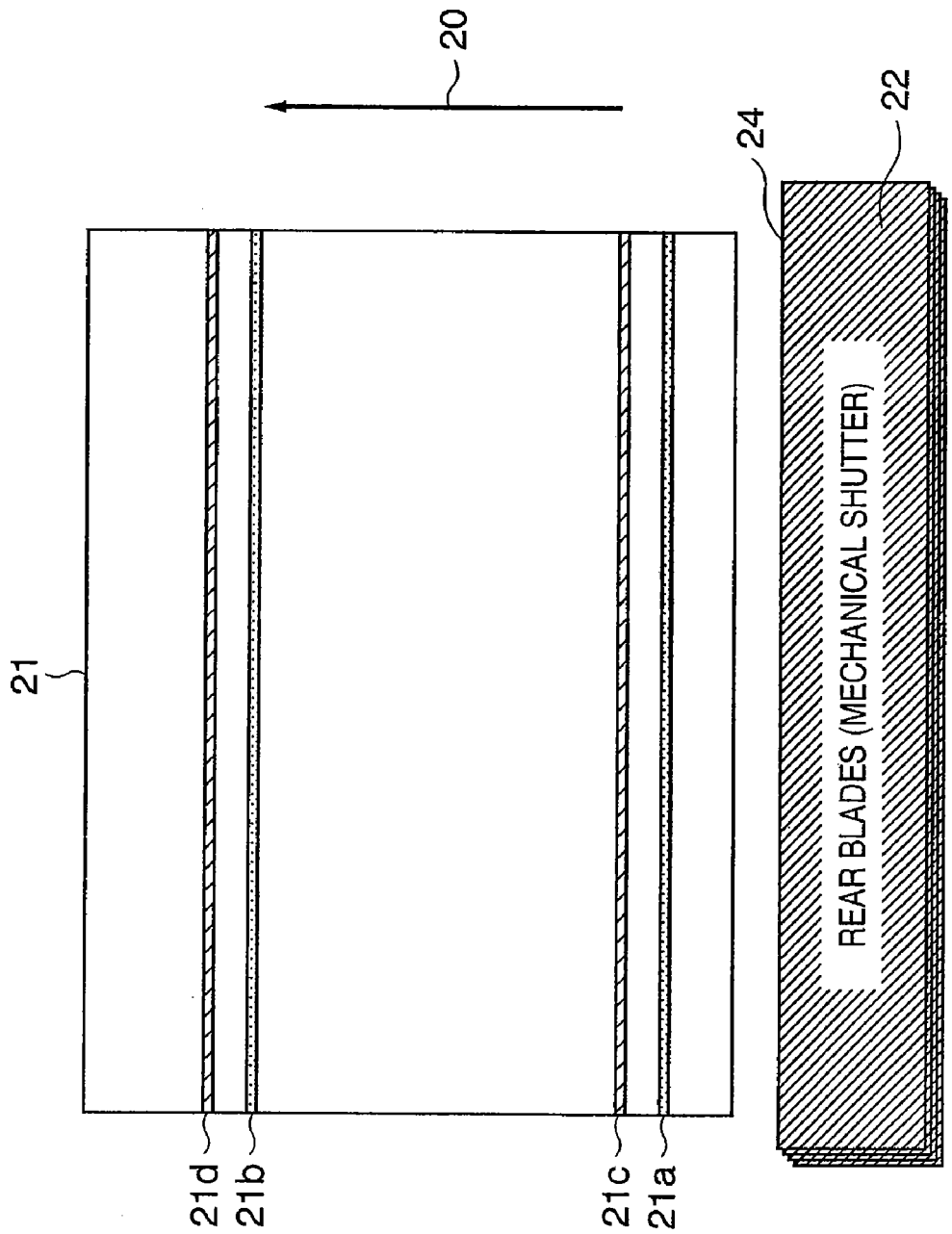
FIG. 10 illustrates the positional shift of scan detection lines according to an embodiment of the present invention.

If the traveling curve detection process is continued (YES in step S37), the camera CPU 101 shifts the position of the scan detection lines in the vertical direction of the image sensing surface 21 (step S38). FIG. 10 is a schematic diagram showing the scan detection lines 21a and 21b and shifted scan detection lines 21c and 21d. Note that in FIG. 10, the same reference numerals are attached to the configuration that is the same as FIG. 5, and description thereof will be omitted. After the position of the scan detection lines has thus been shifted in the vertical direction, processing returns to step S22 of FIG. 6.

After shifting the scan detection lines, processing returns to step S22 of FIG. 6, and processing up to step S32 of FIG. 7 is repeated. If correction is necessary as a result, processing proceeds to step S35, since the judgment of step S33 will be YES. Note that in the second round of processing onwards, the reset scan of step S24 is performed using the traveling curve derived in the previous routine and stored in the internal memory of the camera body 100.

Figure 11:
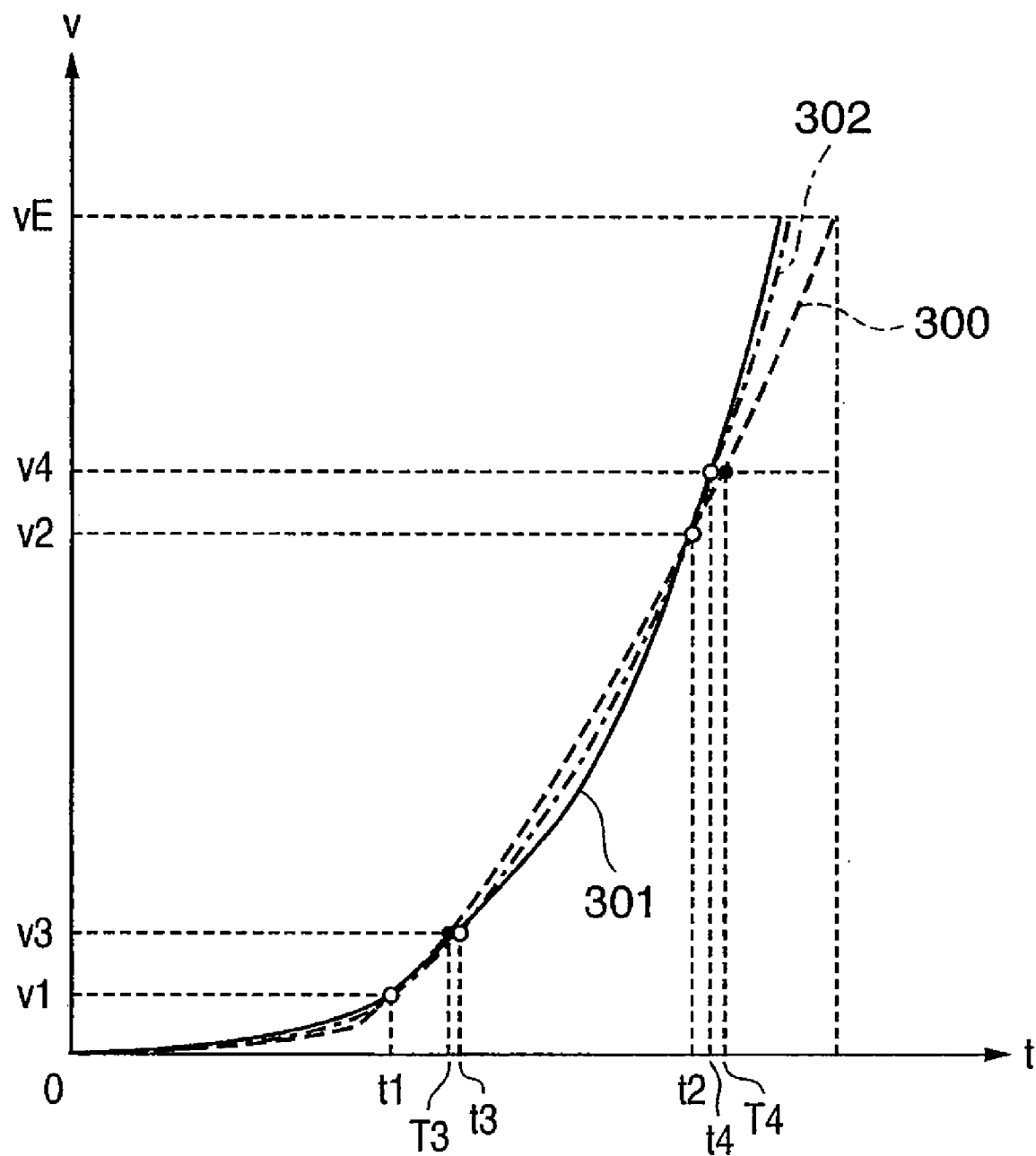
FIG. 11 illustrates a method of correcting the traveling curve of the rear blades in the traveling curve detection process according to an embodiment of the present invention.

In step S35, the camera CPU 101 corrects the traveling curve based on the newly derived (ti, vi) and (ti, vi) stored in the internal memory of the camera body 100. The derived traveling curve is shown in FIG. 11, with the newly derived (ti, vi) being the values of the scan detection lines 21c and 21d shown in FIG. 10. Here, the crossing time and position for the scan detection line 21c is given as (t3, v3), and the crossing time and position for the scan detection line 21d is given as (t4, v4). The crossing times for the scan detection lines 21c and 21d calculated from the pre-correction traveling curve 300 in order to derive the crossing times t3 and t4 are given respectively as T3 and T4. T3 and T4 can be derived from the traveling curve 300 and the positions of the scan detection lines 21c and 21d.

Here, as shown in FIG. 11, the camera CPU 101 plots (t1, v1), (t2, v2), (t3, v3) and (t4, v4), and approximates the traveling curve so as to pass through these points. A traveling curve 302 can thereby be obtained that more closely approaches the actual traveling curve 301, in comparison to the traveling curve 300 derived based only on (t1, v1) and (t2, v2).

Once the traveling curve 302 has been acquired in step S35, the camera CPU 101 stores this traveling curve 302 in the internal memory of the camera body 100 (step S36), before proceeding to step S37. If the traveling curve detection process is further continued, the position of the scan detection lines is further shifted, and the aforementioned processing is repeated. On the other hand, if the traveling curve detection process is ended, processing returns to FIG. 6, and the series of processing is ended. The traveling curve detection process is ended, for example, if correction of the traveling curve is judged in step S31 to be unnecessary a plurality of times in a row, or if an instruction has been issued to end the traveling curve detection process as a result of the user operating the switch unit 112. The traveling curve detection process is also ended if an instruction to start the image capture operation is issued as a result of the user operating the switch unit 112 during traveling curve detection.

By thus shifting the position of the scan detection lines on the image sensing surface 21 of the image sensing element 104 whenever detection of the traveling curve of the rear blades 22 is repeated, an effect equivalent to increasing the locations of scan detection lines can be obtained, enabling an approximated curve that more closely approaches the actual traveling curve to be obtained. In the case where still image capture is performed using the shutter apparatus 105, an image with reduced exposure unevenness can thereby be provided to the user, together with decreasing the timing difference between the exposure periods at the top and bottom of the screen.

Since the traveling curve of the rear blades is detected using the output of the image sensing element, provision of other detection means such as position detection sensors is not required, avoiding increases in the size or cost of the image sensing system.

Note that while the scan detection lines are described in the foregoing embodiment as respectively being one pixel row of the image sensing element, the scan detection lines are not limited to this configuration. By using one or more pixels of the image sensing element that are not in the same row, for example, the time required in traveling curve detection can be further shortened.

In the foregoing embodiment, two scan detection lines are set for every time the traveling curve detection process of the rear blades is performed. As an alternative, three or more scan detection lines may be set. Increasing the number of scan detection lines enables the obtained traveling curve to be brought closer to the actual traveling curve, although in this case, the number of scan detection lines is preferably set so that the time taken to read charge from the scan detection lines is not too long.

Conversely, one scan detection line may be set for every time the traveling curve detection process of the rear blades is performed, and the position at which the rear blades are held and the signal to release the holding power of the electromagnet may be used as the crossing time.

Also, while the image sensing element 104 is described in the foregoing embodiment as being a CMOS image sensor, the image sensing element is not limited to being a CMOS image sensor provided it is an XY addressing type image sensing element.

MODIFICATIONS

According to the foregoing embodiment, the time needed to read the accumulated charge of the scan detection lines 21a and 21b in exposure operation 1 is within 2 ms, thereby enabling this operation to be completed in a short period of time that does not cause release time lag. Thus, exposure operation 2 can also be performed as normal image capture, rather than as an operation for only detecting the traveling curve of the rear blades. In this case, the image sensing element 104 and the shutter apparatus 105 are driven with the following procedures.

Firstly, when a release switch SW included in the switch unit 112 is operated by the user, the processing flow of FIG. 6 is started, and the above exposure operation 1 is performed in steps S22 to S23.

Next, in step S24, the camera CPU 101 sequentially resets the charge of all of the pixels so as to match the traveling curve of the rear blades 22 stored in an internal memory (not shown) of the camera body 100. After the exposure period Te (=the charge accumulation period Tc) has elapsed, the camera CPU 101 in step S25 drives the rear blades 22 to shield the image sensing surface 21. Once the rear blades 22 have been driven, the camera CPU 101 in step S26 reads the charge of all of the pixels to read the accumulated charge. Once the charge has been read, the camera CPU 101 in step S27 charges the rear blades 22 in readiness to perform a normal image sensing operation or the next traveling curve detection operation, and returns the rear blades 22 to the start position shown in FIG. 5. Processing then proceeds to step S28, where the camera CPU 101 extracts the charge of the scan detection lines from all the read charge, and performs the traveling curve correction process shown in FIG. 7.

Performing this control enables the traveling curve to be corrected whenever normal image capture is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-244830, filed on Sep. 8, 2006, which is hereby incorporated by reference herein in its entirety.

What is claimed is:

1. A method of acquiring traveling characteristics of a light-shielding member in an image sensing apparatus having an image sensing element including a plurality of pixels that converts an optical image of an object incident thereon to an electrical image signal and outputs the image signal, the light-shielding member being operable to occlude an aperture to the image sensing element, said method comprising:

an acquiring step of acquiring the traveling characteristics of the light-shielding member based on an image signal output from a selected partial area of the image sensing element, storing the acquired traveling characteristics in a storage means;

a shifting step of shifting the selected partial area to another partial area placed at a different position spaced apart from the selected partial area along the traveling direction of the light-shielding member, wherein the traveling characteristics of the light-shielding member is acquired in said acquisition step on the basis of image signals output from the selected partial area and the another partial area; and wherein the acquiring step includes:

a first reading step of reset scanning the image sensing element based on the traveling characteristics stored in the storage medium, shielding the image sensing element by driving the light-shielding member after a preset exposure period, and outputting an image signal from the partial area;

a second reading step, prior to said first reading step, of accumulating charge for the same length of time as the exposure period, and outputting an image signal from the partial area;

a step of acquiring characteristic data showing the traveling characteristics based on the image signals output in said first and second reading steps, and storing the acquired characteristic data in the storage means; and a step of acquiring the traveling characteristics using the characteristic data stored in the storage medium.

2. The acquisition method according to claim 1, wherein in said first reading step, an image signal is output from an entire area of the image sensing element, and the image signal of the partial area is acquired from the output image signal of the entire area.

3. The acquisition method according to claim 1, wherein said shifting step, acquiring step and updating step are repeatedly executed.

4. The acquisition method according to claim 1, wherein the partial area includes a plurality of areas that are spaced apart from each other in the traveling direction of the light-shielding member.

5. The acquisition method according to claim 1 in which the acquiring step comprises:

measuring the charge accumulated in pixels in a first selected partial area of the image sensing element in a time period $T_c$, measuring the charge accumulated in pixels in a second selected partial area of the image sensing device in the time period $T_c$, the second selected partial area being spaced apart from the first selected partial area in the direction of travel of the light shielding member, resetting the pixels to restart charge accumulation, driving the light shielding member to travel to stop the light from impinging upon the first and second selected partial areas of the image sensing element after a time period nominally equal to the time period $T_c$, but differing from $T_c$ by different amounts because of the position/time traveling characteristic of the light shielding member, measuring the charge accumulated in the pixels in the first selected partial area of the image sensing element in the time period $T_a$, this time period starting with the pixel resetting operation on the first selected partial area and ending when the edge of the light shielding member crosses the first selected partial area and blocks the light from impinging upon the first selected partial area, measuring the charge accumulated in the pixels in the second selected partial area of the image sensing element in the time period $T_b$, this time period starting with the pixel resetting operation on the second selected partial area and ending when the edge of the light shielding member crosses the second selected partial area and blocks the light from impinging upon the second selected partial area, calculating from the accumulated charge measured during time periods $T_c$ $T_a$ and $T_b$ the time when the edge of the light shielding member crosses the first and second selected partial areas, thereby providing said traveling characteristic.

6. An image sensing apparatus comprising:

an image sensing element having a plurality of pixels that converts an optical image of an object incident thereon to an electrical image signal and outputs the image signal;

a light-shielding member that is operable to occlude an aperture to said image sensing element;

storage means;

control means that is configured to acquire traveling characteristics of said light-shielding member based on an image signal output from a selected partial area of said image sensing element, store the acquired traveling characteristics in said storage means, and shift the selected partial area to another partial area placed at a different position spaced apart from the selected partial area along the traveling direction of said light-shielding member, wherein the traveling characteristics of the light-shielding member is acquired by said control means on the basis of image signals output from the selected partial area and the another partial area, and wherein said control unit, when acquiring and updating the traveling characteristics, is adapted to perform:

a first reading control of reset scanning the image sensing element based on the traveling characteristics stored in said storage means, shielding said image sensing element by scanning said light-shielding member after a preset exposure period, and providing an image signal from the partial area, a second reading control, prior to the first reading control, of accumulating charge for the same length of time as the exposure period, and providing an image signal from the partial area, acquiring characteristic data showing the traveling characteristics based on the image signals output as a result of the first and second reading controls, and storing the acquired characteristic data in the storage means; and acquiring the traveling characteristics using the characteristic data stored in said storage means.

7. The image sensing apparatus according to claim 6, wherein in the first reading control, an image signal is output from an entire area of said image sensing element, and the image signal of the partial area is acquired from the output image signal of the entire area.

8. The image sensing apparatus according claim 6, wherein said control means repeatedly executes the shifting of the partial area and the updating of the traveling characteristics.

9. The image sensing apparatus according claim 6, wherein the partial area includes a plurality of areas that are spaced apart from each other in the traveling direction of the light shielding member.

10. The image sensing apparatus according claim 6, wherein the light-shielding member comprises the rear blades of a shutter.

11. A method of estimating the traveling characteristic of the shutter blade(s) in a camera having an image sensing element including a plurality of rows of photoelectric pixels, said method comprising:

measuring the charge accumulated in pixels in a first selected partial area of the image sensing element in a time period $T_c$, measuring the charge accumulated in pixels in a second selected partial area of the image sensing device in the time period $T_c$, the second selected partial area being spaced apart from the first selected partial area in the direction of travel of the shutter blade(s), resetting the pixels to restart charge accumulation, driving the shutter blade(s) to travel to stop the light from impinging upon the first and second selected partial areas of the image sensing element after a time period nominally equal to the time period $T_c$, but differing from $T_c$ by different amounts because of the position/time traveling characteristic of the shutter blade(s), measuring the charge accumulated in the pixels in the first selected partial area of the image sensing element in the time period $T_a$, this time period starting with the pixel resetting operation on the first selected partial area and ending when the edge of the shutter blade(s) crosses the first selected partial area and blocks the light from impinging upon the first selected partial area, measuring the charge accumulated in the pixels in the second selected partial area of the image sensing element in the time period $T_b$, this time period starting with the pixel resetting operation on the second selected partial area and ending when the edge of the shutter blade(s) crosses the second selected partial area and blocks the light from impinging upon the second selected partial area, calculating from the accumulated charge measured during time periods $T_c$ $T_a$ and $T_b$ the time when the edge of the shutter blade(s) cross the first and second selected partial areas, thereby providing an estimate of said traveling characteristic.

* * * * *